United States Patent
Eyster

(10) Patent No.: US 11,787,740 B2
(45) Date of Patent: Oct. 17, 2023

(54) ASPHALT BINDERS AND BITUMINOUS COMPOSITIONS COMPRISING NAPHTHENIC ACID ESTERS

(71) Applicant: Heritage Research Group, Indianapolis, IN (US)

(72) Inventor: Perry Eyster, Brownsburg, IN (US)

(73) Assignee: Heritage Research Group, Indianapolis, IN (US)

( * ) Notice: Subject to any disclaimer, the term of this patent is extended or adjusted under 35 U.S.C. 154(b) by 349 days.

(21) Appl. No.: 17/302,088

(22) Filed: Apr. 23, 2021

(65) Prior Publication Data

US 2021/0238093 A1    Aug. 5, 2021

Related U.S. Application Data

(63) Continuation of application No. PCT/US2019/057409, filed on Oct. 22, 2019.

(60) Provisional application No. 62/749,917, filed on Oct. 24, 2018.

(51) Int. Cl.

| | |
|---|---|
| *C04B 26/26* | (2006.01) |
| *C08L 95/00* | (2006.01) |
| *C04B 24/04* | (2006.01) |
| *C08K 5/101* | (2006.01) |

(52) U.S. Cl.
CPC ............ *C04B 26/26* (2013.01); *C04B 24/045* (2013.01); *C08K 5/101* (2013.01); *C08L 95/00* (2013.01); *C08L 2555/22* (2013.01); *C08L 2555/34* (2013.01); *C08L 2555/60* (2013.01)

(58) Field of Classification Search
None
See application file for complete search history.

(56) References Cited

U.S. PATENT DOCUMENTS

| 2,016,392 | A | * | 10/1935 | Schneider ............... C07C 67/08 560/1 |
|---|---|---|---|---|
| 5,383,965 | A | | 1/1995 | Carmine et al. |
| 5,437,718 | A | | 8/1995 | Carmine et al. |
| 2010/0155304 | A1 | | 6/2010 | Ding et al. |
| 2014/0230693 | A1 | | 8/2014 | Gonzalez Leon et al. |

FOREIGN PATENT DOCUMENTS

| CN | 104245850 A | 12/2014 |
|---|---|---|
| WO | 2013163463 A1 | 10/2013 |
| WO | 2013163467 A1 | 10/2013 |

OTHER PUBLICATIONS

Lottermoser, Bernd G. "Recycling, Reuse and Rehabilitation of Mine Wastes" Elements (2011) 7 (6): 405-410. (Year: 2011).*
Kiran et al "Impact of Asphaltenes and Naphthenic Amphiphiles on the Phase Behavior of Solvent-Bitumen-Water Systems" ACS Publications Mar. 25, 2011 dx.doi.org/10.1021/ef1016285 Energy Guels 2011, 25, 2223-2231 (Year: 2011).*
Dastjerdi and Dube "Acid-Catalyzed Esterification of Naphthenic Acids" DOI 10.1002/ep11606 Wiley Online Library Environmental Progress & Sustainable Energy (vol. 32, No. 2) Pub'd Online Feb. 17, 2012. (Year: 2012).*
China App. No. 201980085162.0 First Office Action dated Apr. 20, 2022 (translated). 8 pages.
Bailey, Helen "The Use of Vegetable Oil as a Rejuvenator for Asphalt Mixtures" in: 5th Eurasphalt & Eurobitume Congress, 2012, pp. 1-10. 10 pages.
Khattak, M.J. "Analysis of Fatigue and Fracture of Hot Mix Asphalt Mixtures" in: ISRN Civil Engineering, vol. 2013, pp. 1-10. 11 pages.
Quiroga-Becerra, H. "A Kinetic Study of Esterification of Naphthenic Acids from a Colombian Heavy Crude Oil" in: Ciencia Technologia Y Futuro, vol. 4, No. 5 (2012). 11 pages.
Khan, M.K. "Removal of Naphthenic Acids from High Acid Crude Via Esterification with Methanol" in: Fuel Processing Technology, Elsevier BV, NL, vol. 165 (2017). pp. 123-130. 8 pages.
International Patent Application No. PCT/US2019/057409 International Search Report dated Apr. 30, 2020. 5 pages.
International Patent Application No. PCT/US2019/057409 Written Opinion dated Apr. 30, 2020. 13 pages.
International Patent Application No. PCT/US2019/057409 International Preliminary Report on Patentability dated May 6, 2021. 15 pages.

* cited by examiner

*Primary Examiner* — Alexandra M Moore
(74) *Attorney, Agent, or Firm* — WOODARD, EMHARDT, HENRY, REEVES & WAGNER, LLP

(57) ABSTRACT

Asphalt binders and bituminous compositions comprising additives such as naphthenic acid esters. In certain embodiments the ester compounds may be useful as rheology modifiers for use in bituminous binders in road paving applications.

24 Claims, No Drawings

US 11,787,740 B2

1

ASPHALT BINDERS AND BITUMINOUS COMPOSITIONS COMPRISING NAPHTHENIC ACID ESTERS

CROSS REFERENCE TO RELATED APPLICATION

This application is a continuation of International Application No. PCT/US2019/057409 filed Oct. 22, 2019, which claims the benefit of U.S. Provisional Patent Application No. 62/749,917 filed Oct. 24, 2018, which are hereby incorporated by reference in its entirety.

FIELD

The present disclosure relates to asphalt binders and bituminous compositions comprising naphthenic acid-based esters, such as polyol esters of naphthenic acid. In certain embodiments the naphthenic esters may be useful as rheology modifiers for use in bituminous binders in road paving applications, such as aiding in the reclamation and integration of aged bitumen from a recycled asphalt product into the binder of a new cold, warm, or hot mix asphalt.

BACKGROUND

Asphalt bitumen is a key ingredient in pavements, roofing and waterproofing applications. The primary use of asphalt is in road construction, where it is used as the glue or binder for the aggregate particles, and accounts for approximately 80% of the asphalt consumed in the United States. The most common type of flexible pavement surfacing in the United States is hot mix asphalt (HMA) that may also be known by many different names such as hot mix, asphalt concrete (AC or ACP), asphalt, or blacktop.

Additives such as polymers and rheology modifiers can be added to asphalt binder compositions in an effort to augment the overall properties of the resulting product in an effort to account for variations in the refined asphalt binder, and/or optimize the performance of the product depending on the viscoelastic properties that may be required for the resulting application. Accordingly, there remains a need to develop asphalt binder compositions comprising novel rheology modifiers.

SUMMARY

Described herein are compositions comprising a bituminous binder and a rheology modifier comprising at least one naphthenic ester. In certain embodiments, the naphthenic ester comprises a naphthenic polyol ester, such as a naphthenic triglyceride. In certain embodiments are described asphalts comprising aggregate, a bituminous binder, and at least one rheology modifier comprising at least one naphthenic ester compound.

DETAILED DESCRIPTION

As used in the present specification, the following words, phrases and symbols are generally intended to have the meanings as set forth below, except to the extent that the context in which they are used indicates otherwise. The following abbreviations and terms have the indicated meanings throughout:

"Asphalt" refers to a composite material comprising an asphalt binder (bitumen) and aggregate, which is generally used for paving applications. Such asphalt is also known as "asphalt concrete." Examples of asphalt grades used in paving applications include stone mastic asphalt, soft asphalt, hot rolled asphalt, dense-graded asphalt, gap-graded asphalt, porous asphalt, mastic asphalt, and other asphalt types. Typically, the total amount of bituminous binder in asphalt is from 1 to 10 wt. % based on the total weight of the asphalt, in some cases from 2.5 to 8.5 wt. % and in some cases from 4 to 7.5 wt. %.

"Aggregate" (or "construction aggregate") is particulate mineral material suitable for use in asphalt. It generally comprises sand, gravel, crushed stone, and slag. Any conventional type of aggregate suitable for use in asphalt can be used. Examples of suitable aggregates include granite, limestone, gravel, and mixtures thereof.

"Bitumen" refers to a mixture of viscous organic liquids or semi-solids from crude oil that is black, sticky, soluble in carbon disulfide, and composed primarily of condensed aromatic hydrocarbons. Alternatively, bitumen refers to a mixture of maltenes and asphaltenes. Bitumen may be any conventional type of bitumen known to the skilled person. The bitumen may be naturally occurring. It may be crude bitumen, or it may be refined bitumen obtained as the bottom residue from vacuum distillation of crude oil, thermal cracking, or hydrocracking.

Performance Grade (PG) is defined as the temperature interval for which a specific asphalt product is designed. For example, an asphalt product designed to accommodate a high temperature of 64° C. and a low temperature of −22° C. has a PG of 64-22. Performance Grade standards are set by the National Committee of Highway and Roadway Professionals (NCHRP).

The bitumen may be commercially available virgin bitumen such as paving grade bitumen, e.g. bitumen suitable for paving applications. Examples of commercially available paving grade bitumen include, for instance, bitumen which in the penetration grade (PEN) classification system are referred to as PEN 35/50, 40/60 and 70/100 or bitumen which in the performance grade (PG) classification system are referred to as PG 64-22, 58-22, 70-22 and 64-28.

Such bitumen is available from, for instance, Shell, Total and British Petroleum (BP). In the PEN classification, the numeric designation refers to the penetration range of the bitumen as measured with the EN 1426 method, e.g., a 40/60 PEN bitumen corresponds to a bitumen with a penetration which ranges from 40 to 60 decimillimeters (dmm). In the PG classification (AASHTO MP 1 specification), the first value of the numeric designation refers to the temperature performance and the second value refers to the low-temperature performance as measured by a method which is known in the art as the Superpave$^{SM}$ system.

The bitumen may also be contained in or obtained from reclaimed asphalt shingles or reclaimed asphalt pavement, and is referred to as bitumen of RAS or RAP origin, respectively.

"Binder" refers to a combination of bitumen and, optionally, other components such as elastomers, non-bituminous binders, adhesion promoters, softening agents, or other suitable additives. Useful elastomers include, for example, ethylene-vinyl acetate copolymers, polybutadienes, ethylene-propylene copolymers, ethylene-propylene-diene terpolymers, butadiene-styrene block copolymers, styrene-butadiene-styrene (SBS) block terpolymers, isoprene-styrene block copolymers and styrene-isoprene-styrene (SIS) block terpolymers, or the like. Cured elastomer additives may include ground tire rubber materials. In one embodiment, the additional additives may be added to an asphalt binder in amounts ranging from about 0.1 wt. % to about 10 wt. %. The term bitumen is sometimes used interchangeably with binder.

"Recovered binder" or "reclaimed binder" refers to aged binder that is present in or is recovered from reclaimed asphalt. Normally, the recovered binder is not isolated from the reclaimed asphalt. Recovered binder has a high viscosity compared with that of virgin bitumen as a result of aging and exposure to outdoor weather.

"Aged binder" includes recovered or reclaimed binder and laboratory-aged binder. Aged binder can also refer to hard, poor-quality, or out-of-spec virgin binders that could benefit from combination with a rheology modifier as described herein, particularly virgin binders having a ring-and-ball softening point greater than 65° C. by EN 1427 and a penetration value at 25° C. by EN 1426 less than or equal to 12 dmm.

"Laboratory-aged binder" refers to virgin binder that has been aged using the RTFO ("rolling thin film oven") and PAV ("pressure aging vessel") laboratory aging test methods that are known in the art.

"Virgin binder" is binder that has not been used previously for road paving or "Virgin bitumen" (also known as "fresh bitumen") refers to bitumen that has not been used, e.g., bitumen that has not been recovered from road pavement or reclaimed shingles. Virgin bitumen is a component of virgin binder.

"Virgin asphalt" refers to a combination of virgin aggregate with virgin bitumen or virgin binder. Virgin asphalt has not been used previously for paving.

"Reclaimed asphalt" generally includes reclaimed asphalt shingles (RAS), reclaimed asphalt pavement (RAP), reclaimed asphalt from plant waste, reclaimed asphalt from roofing felt, and asphalt from other applications. Reclaimed asphalt may contain aggregate and an aged bitumen binder.

"Reclaimed asphalt shingles" (RAS) are asphalt compositions that have been used previously as roofing material or have been recovered as waste from shingle manufacturing. RAS recovered from these sources is processed by well-known methods, including milling, ripping, breaking, crushing, and/or pulverizing.

"Reclaimed asphalt pavement" (RAP) is asphalt that has been used previously as pavement. RAP may be obtained from asphalt that has been removed from a road or other structure, and then has been processed by well-known methods. Prior to use, the RAP may be inspected, sized and selected, for instance, depending on the final paving application.

"Emulsion" generally refers as a multiphase material in which all phases are dispersed in a continuous aqueous phase. The aqueous phase may comprise surfactants, acid, base, thickeners, and other additives. The dispersed phase may comprise thermoplastic natural and synthetic polymers, waxes, asphalt, other additives including rheology modifier(s), optionally petroleum based oils or mixtures thereof, herein collectively referred to as the "oil phase." High shear and energy can be used to disperse the oil phase in the aqueous phase using apparatus such as colloidal mills.

"Pavement preservation" refers to a proactive maintenance of roads to prevent them from getting to a condition where major rehabilitation or reconstruction is necessary. A pavement preservation application may be any of fog seal, slurry seal, micro-surfacing, chip seal, scrub seal, cape seal, and combinations thereof wherein an asphalt emulsion with optional additives is applied onto an existing road or pavement as a "seal" to seal the surface. In some embodiments, polymer is added to the asphalt emulsion to provide better mixture properties.

"Fog seal" is a pavement preservation application of an asphalt emulsion via a spray application ("fogging").

"Slurry seal" refers to a pavement preservation application wherein a mixture of water, asphalt emulsion, and aggregate is applied to an existing asphalt pavement surface. A slurry seal is similar to a fog seal except the slurry seal has aggregates as part of the mixture for a "slurry" and slurry seals are generally used on residential streets.

"Microsurfacing" refers to a form of slurry seal, with the application of a mixture of water, asphalt emulsion with additives, aggregate (very small crushed rock), and additives to an existing asphalt concrete pavement surface. A difference between slurry seal and microsurfacing is in how they "break" or harden. Slurry relies on evaporation of the water in the asphalt emulsion. The asphalt emulsion used in microsurfacing contains additives which allow it to break without relying on the sun or heat for evaporation to occur, for the surface to harden quicker than with slurry seals.

"Chip seal" refers a pavement reservation application wherein first asphalt emulsion is applied then then a layer of crushed rock is applied to an existing asphalt pavement surface. "Chip seal" gets its name from the "chips" or small crushed rock placed on the surface.

"Scrub seal" refers to a pavement preservation application that is very close to a chip seal treatment where asphalt emulsion and crushed rock are placed on an asphalt pavement surface. The only difference is that the asphalt emulsion is applied to the road surface through a series of brooms placed at different angles. These brooms guide the asphalt emulsion into the pavement distresses to ensure sealing the road. These series of brooms, known as a "scrub broom", give the treatment its title, "scrub seal."

"Cape seal" is a combination of applications, i.e., an application of a chip or scrub seal followed by the application of slurry seal or microsurfacing at a later date.

"Rehabilitation" refers to applications carried out with pavements that exhibit distresses beyond the effectiveness of pavement preservation techniques, but not too severe to warrant the cost of complete reconstruction. As pavement ages, it will deteriorate due to weathering and traffic loading, but not to the point of complete reconstruction, so rehabilitation techniques can be performed.

"Cold in-place recycling" or CIR refers to applications involving a milling machine with a paver mixer, wherein the milling machine breaks and pulverizes a thin amount of the top layer of the old pavement. The material is crushed and screened to the proper size and asphalt emulsions and/or additives including rheology modifiers or rejuvenators are mixed in to rejuvenate the material to give more life. In some applications, virgin aggregate can be added and spread on the existing surface. The material is picked up by the paver and spread, then compacted using known methods, e.g., steel-wheel, pneumatic-tire, or vibratory rollers.

"Rubberized asphalt" refers to an asphalt mix, e.g., hot-mixed asphalt, containing crumb rubber. In some embodiments, the crumb rubber utilized is generated from recycled tires, wherein the tires are shredded and the steel enforcement and fibers are separated from the rubber. In some embodiments, the crumb rubber serves as a modifier for the asphalt and gives the asphalt greater viscosity and may improve cracking properties.

"Rheology modifier" generally refers to a composition or blend that can be used in asphalt compositions for road and pavement applications including but not limited to new construction, partial or complete re-construction, rehabilitation, preservation, CIR, e.g., in asphalt emulsion compositions, or in combination with aged binder or reclaimed asphalt (or their mixtures with virgin binder and/or virgin asphalt) to modify flow or other properties of the aged binder or reclaimed asphalt and, in some cases, restores some or most of the original properties of virgin binder or virgin asphalt.

Good low-temperature performance is desirable to avoid of cracking, which is a common failure mode for asphalt road surfaces, particularly those that experience high traffic rates or high weight traffic and cold temperatures. The use of naphthenic ester compounds, optionally in combination with one or more additional components, have not been previously described for use as rheology modifiers for bituminous binders, including reclaimed asphalt binders. In certain embodiments, the use of at least one naphthenic esters can aid in the reclamation and use of aged binders (e.g., derived from RAS or RAP) for use in new HMA applications. In this example, the modified binders in asphalt compositions expand the utility of reclaimed asphalt, thereby helping the road construction industry reduce its reliance on virgin, non-renewable materials.

As used in this specification and the appended claims, the articles "a," "an," and "the" include plural referents unless expressly and unequivocally limited to one referent.

The term "acid residue" (such as naphthenic acid residue or aliphatic acid residue) refers to the portion of a larger molecule that is derived from a free carboxylic acid. For example, the "naphthenic residue" of a naphthenic acid monoglyceride derived from glycerine and a $C_{10}$ naphthenic acid would include the $C_9$ hydrocarbon portion and the carbonyl portion of the original naphthenic acid. Likewise, the "aliphatic residue" of an aliphatic acid monoglyceride derived from glycerine and a $C_{18}$ fatty acid (e.g., stearic acid) would include the $C_{17}$ aliphatic portion and the carbonyl portion of the original fatty acid. A naphthenic acid ester can be characterized by the % weight the ester is comprised of content contributed by the constituent naphthenic acid ester groups. For example, a naphthenic monoglyceride derived from glycerine (MW=92.09) and 3-(3-ethylcyclopentyl)propanoic acid (MW=170.25) would receive weight contributions from the carbonyl portion and $C_9H_{19}$ aliphatic portion of the naphthenic acid, meaning the resulting monoglyceride would be comprised of about 63 wt. % naphthenic acid residue content.

The term "naphthenic acid" generally refers to carboxylic acids that are cycloaliphatic in nature. Exemplary naphthenic acids would include carboxylic acids having cyclopentyl and/or cyclohexyl groups contained in the hydrocarbon chain (e.g., 3-(3-ethylcyclopentyl)propanoic acid). In certain embodiments, the naphthenic acid will contain 10-16 carbons. In certain embodiments the cycloaliphatic group will be substituted with an alkyl group, such that the cycloaliphatic group is thus not positioned at the terminus of the carboxylic acid tail.

All numerical ranges herein include all numerical values and ranges of all numerical values within the recited range of numerical values.

In certain embodiments the compositions described herein comprise at least one bitumen and at least one naphthenic ester. In certain embodiments, the naphthenic ester comprises a naphthenic alkyl ester. Naphthenic alkyl esters may include, but are not limited to, esters that are derived from the reaction of a naphthenic acid with a monoalcohol such as a $C_1$-$C_{20}$ monoalcohol. Exemplary monoalcohols include methanol, ethanol, propanol, isopropanol, n-butanol, sec-butanol, tert-butanol, etc.

In certain embodiments, the naphthenic ester comprises a naphthenic polyol ester. Naphthenic polyol esters may include, but are not limited to, esters that are derived from the reaction of a naphthenic acid with a polyol comprising 2 or more hydroxyl groups (e.g., 2-12 hydroxyl groups). In certain embodiments, the polyol will comprise 2 to 12 carbon groups. In certain embodiments, the naphthenic ester can be formed with an uneven molar ratio of naphthenic acid to hydroxyl groups on the polyol, such that the resulting ester comprises one or more ester residues and unreacted (free) hydroxyl groups. An exemplary naphthenic ester would include one in which 1 mol of naphthenic acid is reacted with 1 mol of glycerine in a one-pot synthesis, which would result in a composition that largely comprises a naphthenic acid monoglyceride. On the other hand, a one-pot synthesis with 4 mol of naphthenic acid and 1 mol of glycerine would result in a composition largely comprising a naphthenic acid triglyceride. Exemplary polyols for forming naphthenic polyol esters include, but are not limited to, glycerine, 1,2- and 1,3-propanediol, diethylene glycol, dipropylene glycol, L4-butanediol, 1,6-hexanediol, pentaerythritol, sorbitol, sucrose, neopentylglycol, 1,2-propylene glycol, trimethylolethane, trimethylolpropane, 1,6-hexanediol, 2,5-hexanediol, 1,4-butanediol, 1,4-cyclohexane diol, ethylene glycol, diethylene glycol, methylene glycol, 9(1)-hydroxymethyloctadecanol, and 1,4-bishydroxymethylcyclohexane.

As noted above, in certain embodiments the naphthenic ester may contain one or more naphthenic acid residues. That is, in certain embodiments the naphthenic acid ester may comprise other functional groups, such as free hydroxyl groups and/or other non-naphthenic acid carboxylic acid residues. For example, in certain embodiments the naphthenic ester may further include at least one aliphatic acid residue (e.g., a fatty acid residue), aromatic acid residue, or heterocyclyl acid residues. Such esters may be formed by reacting a poly-1 such as glycerine with a feed stream that contains a mixture of naphthenic acids with aliphatic acids, aromatic acids, or heterocyclic acids. In certain embodiments, the feed stream may also contain petroleum hydrocarbons (where naphthenics are sourced from), which do not contain reactive functional groups and will be pulled off of the crude reaction mixture after reaction of the polyol with the carboxylic acids. In certain embodiments, the feed stream contains at least 25%, at least 50%, at least 75%, or at least 90% naphthenic acids, such as about 50% to about 95% naphthenic acids. In certain embodiments, the naphthenic ester molecule will contain at least 10 wt. % naphthenic acid residue content, or even as much as at least 25 wt. %, at least 40 wt. %, at least 50 wt. %, at least 60 wt. %, at least 75 wt. %, or even at least 80 wt. % naphthenic acid residue content, such as about 50 to about 85 wt. % naphthenic acid residue content.

In certain embodiments, the reaction of naphthenic acids and other carboxylic acids with alcohols to form the naphthenic esters may be accomplished with or without the presence of a catalyst. Exemplary catalysts include, but are not limited to, those esterification catalysts effective in driving condensation reactions, such as Lewis acids and/or Bronsted acids. A non-limiting list of catalysts includes, for example, AgOTf, Cu(OTf)$_2$, Fe(OTf)$_2$, Fe(OTf)$_3$, NaOTf, LiOTf, Yb(OTf)$_3$, Y(OTf)$_3$, Zn(OTf)$_2$, Ni(OTf)$_2$, Bi(OTf)$_3$, La(OTf)$_3$, Sc(OTf)$_3$, hydrochloric acid, nitric acid, sulfuric acid, methanesulfonic acid, phosphoric acid, perchloric acid, triflic acid, and p-TsOH. In certain embodiments, the catalyst may comprise a strong Lewis acid such as $BF_3$ etherate. In certain embodiments, the reaction is conducted in the presence of dielectric heating, such as microwave radiation.

In some embodiments, the catalyst may comprise a Lewis acid catalyst, such as at least one metal compound selected from one or more of titanium compounds, tin compounds, zirconium compounds, and hafnium compounds. In certain embodiments, the catalyst is at least one titanium compound selected from $TiCl_4$ and $Ti(OCH_2CH_2CH_2CH_3)_4$ (titanium (IV) butoxide). In certain embodiments, the catalyst is at least one tin compound selected from $Sn(O_2CCO_2)$ (tin (II) oxalate), SnO, and $SnC_{12}$. In some embodiments, the catalyst is at least one zirconium compound selected from $ZrCl_4$, $ZrOCl_2$, $ZrO(NO_3)_2$, $ZrO(SO_4)$, and $ZrO(CH_3COO)_2$. In certain embodiments, the catalyst is at least one hafnium compound selected from $HfCl_2$ and $HfOCl_2$. Unless stated otherwise, all metal compounds and catalysts discussed herein should be understood to include their hydrate and solvate forms. For example, in certain embodiments, the catalyst may be selected from $ZrOCl_2 \cdot 8H_2O$ and $ZrOCl_2 \cdot 2THF$, or $HfOCl_2 \cdot 2THF$ and $HfOCl_2 \cdot 8H_2O$.

In one embodiment, the rheology modifier is for use in asphalt compositions comprising aggregate and a binder composition for any of new construction, partial or complete re-construction applications. The rheology modifier can be used for any of paved surfaces, road surfaces and sub-surfaces, runways, shoulders, bridges, bridge abutments, gravel substitutes for unpaved roads, and the like. In addition, the rheology modifier can be used in a variety of industrial applications, not limited to coatings, drilling applications, and lubricants.

In one embodiment, the asphalt compositions comprise any of virgin asphalt, reclaimed asphalt, or mixtures thereof. In yet another embodiment, the rheology modifier is for use in asphalt compositions comprising an asphalt emulsion for use in any of rehabilitation, preservation, or CIR applications.

In one embodiment, the rheology modifier is for use in any of a warm-mix composition (e.g., mixed at a temperature of about 240 to about 280° F.), a hot-mix asphalt composition (e.g., mixed at a temperature of about 280° F. to about 325° F.), which then can be applied to roadways using specialized machines, compacted, and the asphalt hardens as it cools. In another embodiment, the rheology modifier is used in a cold-mix asphalt formulation with aggregate, an emulsion and water.

Rejuvenation of Aged Binder/RA-Binder Compositions. In one embodiment, the rheology modifier is used in a modified binder composition with reclaimed asphalt suitable for use with asphalt, optionally with virgin binder and aggregate. In one embodiment, the binder composition comprises a combination of a bituminous binder and the rheology modifier comprising a naphthenic acid ester and, optionally, other components such as fatty acids, fatty acid esters, etc. Exemplary bituminous binders can come from a variety of sources, including reclaimed binders, optional virgin or performance-grade binders, or combinations thereof.

In some aspects, the reclaimed binder is from any of reclaimed asphalt pavement ("RAP binder"), reclaimed asphalt shingles ("RAS binder"), or combinations thereof. The bituminous binder can include RAS binder, which is present in or recovered from RAS. Binders reclaimed from production waste during shingle manufacture can also be included. The bituminous binder can include RAP binder, which is present in or recovered from RAP. The bituminous binder can also include virgin binder or performance-grade binders in addition to any reclaimed binder. The amount of bituminous binder in a reclaimed asphalt composition (RAS or RAP) is generally known from the supplier, but it may also be determined by known methods, e.g., solvent extraction. For instance, a known amount of RAS or RAP may be treated with a suitable solvent, e.g. dichloromethane, to extract the binder. The amount of binder in the extracted fraction can be measured, thereby providing the content of binder in the RAS or RAP. The amount of aged binder in the RAS or RAP depends on the source, age, history, location, any pre-treatment, and other factors. The amount of aged binder in RAS or RAP typically ranges from any of 1 to 35 wt. %, from 2.5 to 8.5 wt. %, and 4 to 20 wt. % based on the total amount of RAS or RAP. In one embodiment of RAP, the amount of aged binder can be up to 10 wt. %. In one embodiment of a RAS, the amount of aged binder is typically in the range of 20-25 wt. %.

In certain embodiments, the RAP or RAS containing the aged binder is treated with a naphthenic ester to aid in the reclamation/rejuvenation of the aged bitumen. In certain embodiments, this can help with the promotion of full incorporation of the recycled asphalt material into a new asphalt hot mix. In certain embodiments, the naphthenic ester is added at a treat rate of about 0.01 to about 1.0 wt. % of the recycled asphalt material, such as about 0.5 wt. %.

In some embodiments, the aged binder is isolated from the reclaimed asphalt by known methods. In other embodiments, the RAS or RAP is combined with a desirable amount of rheology modifier. In yet other embodiments, the rheology modifier is combined and mixed with the bituminous binder, and optionally virgin asphalt and/or RAP or RAS to give a modified asphalt product. In yet other embodiments, a desirable amount of rheology modifier is combined or first blended with virgin bitumen, then subsequently mixed with RAP and/or RAS.

The modified binder compositions comprise any of 0.01 to 20 wt. %, 0.5 to 15 wt. % or 1 to 10 wt. %, of the rheology modifier based on the combined amounts of binder and rheology modifier. The effective amount of rheology modifier needed to rejuvenate the binder in the RAS/RAP varies and depends on the source of the binder, age, its history, and other factors. Therefore, in certain embodiments, the rheology modifier may comprise about 0.01 to about 10 wt. % of the reclaimed asphalt, such as about 0.05 to about 5 wt. % or about 0.1 to about 3 wt. %, or even about 0.5 to about 1 wt.

In some aspects, the binder composition comprises 50 to 70 wt. % of a performance-grade or virgin binder. In some aspects, the binder composition comprises any of 0.5 to 30 wt. %, 2 to 25 wt. %, or 4 to 15 wt. %, of the virgin binder. In other aspects, the bituminous binder comprises a RAS binder, a RAP binder, or a mixture thereof (100% recycled asphalt and no virgin binder). In some further aspects, the binder comprises a RAS binder.

Evidence of the value of using the rheology modifier in modified binder compositions can be demonstrated with dynamic shear rheometry (DSR) data. Rheology, the study of the deformation and flow of matter, provides a fingerprint of the viscoelastic behavior of a bitumen, whether virgin, aged, conditioned, or treated. This measured behavior is correlated to performance of the bitumen within the aggregate asphalt, and subsequently to the performance of the road. The tests performed function based on the principles of linear viscoelasticity and the superposition principle, where strain on a material is proportional to the stress received. A stress is applied to the sample and the response and delay of that response (phase angle) are analyzed and used to calculate moduli that represent different properties of the sample.

It is found that by combining bituminous binders with a rheology modifier such as naphthenic acid esters, the low-temperature properties of the binders can be improved. Modified bituminous binder can also be used to improve the low-temperature performance of certain grades of asphalt binders without sacrificing high-temperature performance. In certain embodiments, a performance-grade binder can be modified by including up to 20 wt. % RAP binder. An improvement at the low-temperature end and the similar rheological profile at higher temperatures would suggest an improvement in cracking resistance from the blend containing RAS and rheology modifier without a trade-off in fatigue or low-temperature performance.

Methods for Forming Binder Compositions and Application: In some embodiments, binder and asphalt compositions can be made by combining components in any desired order. In one convenient approach, an asphalt composition is made by combining rheology modifier with virgin binder, then blending the resulting mixture with reclaimed asphalt, e.g., RAS and/or RAP. In another approach, an asphalt composition is made by combining rheology modifier with RAS and/or RAP, optionally with virgin asphalt.

In one aspect, the asphalt composition comprises aggregate, RAS and/or RAP, and the rheology modifier blend described above, wherein the asphalt composition further comprises virgin asphalt. The virgin asphalt comprises virgin binder and virgin aggregate. The asphalt composition comprises 1 to 99 wt. % of virgin aggregate based on the combined amounts of virgin asphalt, RAS, RAP, and rheology modifier blend.

In another aspect, the asphalt composition comprises aggregate, RAS and/or RAP, and the rheology modifier. Together, the RAS/RAP binder and the rheology modifier blend form a modified binder having a PG grade at least one grade lower than that of the RAS binder without the rheology modifier. For example, a shift in the PG grade from PG 76-22 to PG 70-22 or from PG 64-22 to PG 58-22 represents a one-grade reduction.

Polymer Compatibilization in Asphalt Compositions. In certain embodiments, asphalt may be modified with elastomeric and plastomeric polymers such as Styrene-Butadiene Styrene (SBS) as well as ground tire rubber to increase high temperature modulus and elasticity, to increase resistance to heavy traffic loading and toughening the asphalt matrix against damage accumulation through repetitive loading. In some embodiments, such polymers are usually used at 3 to 7 wt. % dosages in the asphalt and can be as high as 20% for ground tire rubber. The polymer is high shear blended into asphalt at high temperatures, e.g., >180° C. and allowed to "cure" at similar temperatures during which the polymer swells by adsorption in the asphalt until a continuous phase is achieved. The volume phase of the fully cured polymer will be affected by degree of compatibility of the polymer in the asphalt and the fineness of the dispersed particles.

In one embodiment, the rheology modifier is used to compatibilize polymers and/or ground tire rubber in the asphalt. In one embodiment, the rheology modifier is added and blended into the asphalt before the incorporation of the polymer, or the curing stage.

In one embodiment, the rheology modifier is added to a rubberized asphalt composition in any of a dry process or a wet process. In the dry process, the crumb rubber is combined with a heated aggregate, followed by the addition of the asphalt binder and the rheology modifier. In the wet process, the rheology modifier is mixed with bitumen and rubber particles, or blended separately with bitumen first then mixed together with rubber particles. The rubberized bitumen is then mixed with asphalt. The amount of rubber in the rubberized bitumen (or rubberized asphalt dispersion) is typically in the range of 1 to 25 wt. %. The amount of rheology modifier is typically in the range of 1-10 wt. %. In one embodiment, the rubberized bitumen asphalt dispersion further contains 1 to 10 wt. % of a polyamide stabilizer having an amine number within the range of 50-500 mg KOH/g.

Asphalt Emulsions: The rheology modifier can also be used in asphalt emulsions for applications including pavement preservation, rehabilitation, and CIR applications. Examples of applications or treatments using asphalt emulsions may include rejuvenating, scrub seal, fog seal, sand seal, chip seal, tack coat, bond coat, crack filler or as a material for prevention of reflective cracking of pavements.

Asphalt emulsions comprise globules of paving asphalt, water, an emulsifying agent or surfactant, and the rheology modifier. The emulsifying agent keeps the paving asphalt globules in suspension until it is applied to the pavement surface when the water in the asphalt emulsion starts to evaporate. In one embodiment, the emulsifying agent provides a cationic, anionic, non-ionic, or neutral character to the final emulsion depending upon the desired emulsion's electrochemical properties or the intended emulsion use, for example, the surface type on which the asphalt emulsion is to be applied. The rheology modifier functions to slightly soften the pavement to create a better bond when applied to an existing pavement. Asphalt emulsions can optionally include a latex dispersion, e.g., a SBR latex dispersion as disclosed in U.S. Pat. No. 7,357,594, incorporated herein by reference. In one embodiment, the rheology modifier is used in a polymer-modified asphalt rejuvenating emulsion, which comprises an asphalt phase with an asphalt and the rheology modifier, and an aqueous phase comprising water, a polymer or copolymer (e.g., acrylics such as polychloroprene, copolymers such as styrene-butyl acrylate copolymer) and an emulsifying agent. Examples of polymers or copolymers that can be used in the asphalt emulsion are disclosed in U.S. Pat. No. 8,821,064, incorporated herein by reference. The surfactant comprises from about 0.01% to about 3.0% of the total weight of the emulsion. The polymer or copolymer is about 1% to about 15% of the total weight of the emulsion. The asphalt phase comprises from about 30% to about 70% of the total weight of the emulsion. The rheology modifier comprises about 0.1% to about 15% of the total weight of the emulsion. The ratio of the rheology modifier to the polymer or copolymer may for example be from 1:10 to 5:1, from 1:3 to 3:1, from 1:2 to 2:1, or about 1:1. In one embodiment, the surfactant comprises about 5-30 wt. % of the rheology modifier.

Depending on the type of emulsifying agent used, e.g., cationic, anionic, amphoteric and non-ionic, an acid or a base may be needed to activate the emulsifying agent. In one embodiment with cationic emulsifying agents, acid may be added to adjust the emulsion pH to between 1.0 and 7.0. Suitable acids include inorganic acids, for example hydrochloric acid and phosphoric acid. In some embodiments with anionic emulsifying agents, base may be added to adjust the emulsion pH to between 7.0 and 12.0. In some embodiments with amphoteric emulsifying agents, both the cationic and anionic chemical functionality are built into the same molecule. Therefore, either functionality may be activated; the cationic portion may be activated by acid or the anionic portion may be activated by base. A sufficient amount of emulsifying agent is used maintain a stable emulsion, e.g., from 0.01 to about 5% by weight of the emulsion, from 0.1% to about 3.0% by weight of the emulsion. Examples of emulsifying agents are disclosed in U.S. Patent Publication No. 2014/0230693, incorporated herein by reference.

Exemplary cationic emulsifying agents include polyamines, fatty amines, fatty amido-amines, ethoxylated amines, diamines, imidazolines, quaternary ammonium salts, and mixtures thereof. Exemplary anionic emulsifying agents include alkali metal or ammonium salts of fatty acids, alkali metal polyalkoxycarboxylates, alkali metal N-acylsarcosinates, alkali metal hydrocarbyl sulphonates, for example, sodium alkyl sulphonates, sodium aryl sulphonates, sodium alkyl aryl sulphonates, sodium alkylarene sulphonates, sodium lignosulphonates, sodium dialkyl sulphosuccinates and sodium alkyl sulphates, long chain carboxylic and sulphonic acids, their salts and mixtures thereof. Exemplary amphoteric emulsifying agents include betaines and amphoteric imidazolinium derivatives. Exemplary non-ionic emulsifying agents include ethoxylated compounds and esters, for example ethoxylated fatty alcohols, ethoxylated fatty acids, sorbitan esters, ethoxylated sorbitan esters, ethoxylated alkylphenols, ethoxylated fatty amides, glycerine fatty acid esters, alcohols, alkyl phenols, and mixtures thereof. In one embodiment, the emulsifying agent is an alkoxylated fatty amine surfactant.

Method for Forming & Applications of Asphalt Emulsions: In one embodiment for making an asphalt emulsion (aqueous dispersion), a binder composition is first heated so that it melts, the rheology modifier is added, then an emulsifying solution comprising water and emulsifying agent is added to the molten binder composition. The emulsifying solution and the molten binder are mixed under high shear (e.g. in a colloid mill) to form an emulsion.

The final asphalt emulsion may be applied by hand spreading, conventional spreading, spraying, or other techniques, then letting the emulsion dry. An exemplary application rate may be, for example, about 0.045 to about 2.7 liters/sq. meter (about 0.01 to about 0.60 gal/sq. yd.) or about 0.14 to about 2.0 liters/sq. meter (about 0.03 to about 0.45 gal/sq. yd).

EXAMPLES

Example 1

A feed stream containing 150 g of refined naphthenic acid was added to 100 g of toluene and delivered to a reactor with 21.5 g of glycerin. A catalytic amount of methanesulfonic acid (2.0 g) was slowly added to the reactor. The reactor was heated to about 130° C. until the formation/removal of water ceased. The reactor contents were neutralized with sodium carbonate and washed with deionized water. The organic portion was then dried with anhydrous calcium chloride. An overall yield of approximately 75%, due partly to product loss from emulsification during the washing step.

Example 2

In a 500 ml reactor, 287.0 grams of refined naphthenic acid and 21.57 g of glycerin were mixed with approximately 100 ml of toluene. The reactor was fitted with a Dean Stark water trap to capture and record the water of reaction. The reaction was allowed to reflux for five hours at 130° C. Additional naphthenic acid was added until water was no longer collected. The additional 39 grams of naphthenic acid indicated approximately twice the stoichiometric mass of acids to ensure catalytic activity and timely completion of reaction. The reactor contents were heated under a nitrogen purge to collect toluene and unreacted naphthenic acids.

Example 3

In a 1000 ml reactor, 584 g of crude naphthenic acid and 100 ml toluene were added to 35 g of glycerin. The reactor was fitted with a Dean Stark water trap to capture and record the water of reaction. The reaction was allowed to reflux overnight at 157° C. The reactor contents were distilled at 180° C. with a nitrogen purge then further distilled using a rotary evaporator at 180° C. and 0.8 mm Hg to remove unreacted naphthenic acids and unsaponifiables. The recovered distillate was determined to have approximately the same acid number as the starting crude naphthenic feed stream.

Example 4

Batched samples of RAP were coated with 0.5% of the naphthenic acid triglycerides (produced according to the method of Ex. 2) by weight of RAP and allowed to stand for 48 hours prior to compaction at 150° C. These samples were compared to batched samples of RAP, coated, but heated and compacted immediately, and a control set of batched samples of untreated RAP, heated and compacted at 150° C. Compared to the control, the additive imparts a 37% improvement in field fatigue failure when heated without dwell time and a 137% improvement when given 48 hours of dwell time.

Listing of Embodiments

Embodiments of the present disclosure include:

1. A composition comprising:
   a bituminous binder; and
   a rheology modifier comprising at least one naphthenic ester.

2. The composition according to embodiment 1, wherein the bituminous binder comprises at least one of a reclaimed asphalt pavement binder, a reclaimed asphalt shingle binder, a virgin binder, or a performance-grade binder.

3. The composition according to embodiment 2, wherein the bituminous binder comprises a reclaimed asphalt pavement binder.

4. The composition according to embodiment 2, wherein the bituminous binder comprises a reclaimed asphalt shingle binder.

5. The composition according to embodiment 2, wherein the bituminous binder comprises a virgin binder.

6. The composition according to embodiment 2, wherein the bituminous binder comprises a performance-grade binder.

7. The composition according to embodiment 6, wherein the bituminous binder comprises at least one of a PG 58-28 binder, PG 52-34 binder, PG 58-34 binder, PG 64-28 binder, PG 64-22 binder, a PG 58-31 binder, a PG 58-37 binder, a PG 58-40 binder, a PG 64-25 binder, or a PG 64-31 binder.

8. The composition according to any one of embodiments 1-7, wherein the bituminous binder further comprises at least one polymeric material 9. The composition according to embodiment 8, wherein the polymeric material comprises at least one of an elastomer or a rubber.

10. The composition according to any one of embodiments 1-9, wherein the bituminous binder comprises at least one polymeric material selected from an ethylene-vinyl acetate copolymer, a polybutadiene, an ethylene-propylene copolymer, an ethylene-propylene-diene terpolymer, a butadiene-styrene block copolymer, a styrene-butadiene-styrene (SBS) block terpolymer, an isoprene-styrene block copolymer, or a styrene-isoprene-styrene (SIS) block terpolymer.

11. The composition according to any one of the preceding embodiments, wherein the naphthenic ester comprises a naphthenic polyol ester.

12. The composition according to embodiment 11, wherein the naphthenic poly-1 ester comprises a naphthenic glyceride.

13. The composition according to embodiment 12, wherein the naphthenic poly-1 ester comprises a naphthenic triglyceride.

14. The composition according to any one of embodiments 11-13, wherein the ester is derived from a polyol having at least 2 hydroxyl groups.

15. The composition according to embodiment 14, wherein the ester is derived from a polyol having 2-12 hydroxyl groups.

16. The composition according to any one of embodiments 11-15, wherein the ester is derived from a polyol having 2-12 carbon atoms.

17. The composition according to any one of embodiments 11-16, wherein the ester comprises a glycerine residue.

18. The composition according to any one of embodiments 11-17, wherein the ester comprises at least one naphthenic acid residue.

19. The composition according to embodiment 18, wherein the at least one naphthenic acid residue comprises one or more alkylated cyclopentane or alkylated cyclohexane rings.

20. The composition according to any one of embodiments 18-19, wherein the at least one naphthenic acid residue comprises 10 to 16 carbons.

21. The composition according to any one of embodiments 18-20, wherein the ester comprises at least 2 naphthenic acid residues.

22. The composition according to any one of embodiments 18-21, wherein the ester comprises at least one aliphatic acid residue.

23. The composition according to embodiment 22, wherein the aliphatic residue comprises 2 to 18 carbons.

24. The composition according to any one of the preceding embodiments, wherein the naphthenic ester is derived from a process that includes reacting a naphthenic acid feedstock with an alcohol.

25. The composition according to embodiment 24, wherein the naphthenic acid feedstock comprises naphthenic acids, aliphatic acids, aromatic acids, and petroleum.

26. The composition according to embodiment 24, wherein the naphthenic acid feedstock comprises naphthenic acids, aliphatic acids, and petroleum.

27. The composition according to embodiment 24, wherein the naphthenic acid feedstock comprises naphthenic acids and aliphatic acids.

28. The composition according to embodiment 24, wherein the naphthenic acid feedstock substantially comprises naphthenic acids.

29. An asphalt comprising aggregate and the composition according to any one of embodiments 1-28.

30. A composition comprising:
a recycled asphalt material containing aged bitumen and an aggregate; and
at least one naphthenic acid ester.

31. The composition of embodiment 30, further comprising virgin bitumen binder.

32. The composition according to any one of embodiments 30-31, wherein the at least one naphthenic acid ester is present in about 0.10 to about 1.0 wt. % of the total weight of the recycled asphalt material.

33. The composition according to embodiment 32, wherein the at least one naphthenic ester is present in about 0.5 wt. % of the total weight of the recycled asphalt material.

34. A hot-mix asphalt composition comprising:
a recycled asphalt material containing aged bitumen and an aggregate:
virgin binder; and
at least one naphthenic acid triglyceride.

35. The composition of any one of the preceding embodiments, wherein the naphthenic acid ester contains a naphthenic acid residue content of at least 60 wt. %.

36. The composition of any one of the preceding embodiments, wherein the naphthenic acid ester contains a naphthenic acid residue content of at least 75 wt. %.

37. The composition of any one of the preceding embodiments, wherein the naphthenic acid ester contains a naphthenic acid residue content of at least 80 wt. %.

38. A naphthenic acid polyol ester compound.

39. A naphthenic acid triglyceride compound.

40. The compound of any one of embodiments 38-39, wherein the compound contains a naphthenic acid residue content of at least 80 wt. %.

41. The compound of any one of embodiments 38-39, wherein the compound contains a naphthenic acid residue content of at least 85 wt. %.

42. A method of preparing a rejuvenated asphalt, comprising:
selecting a reclaimed asphalt; and
contacting it with at least one naphthenic ester.

43. The method of embodiment 42, wherein the reclaimed asphalt comprises RAP or RAS.

44. The method of any of embodiments 42-43, wherein the naphthenic ester comprises about 0.1 to about 5 wt. % of the rejuvenated asphalt.

45. The method of any of embodiments 42-43, wherein the naphthenic ester comprises about 0.5 to about 1 wt. % of the rejuvenated asphalt.

46. The method of any one of embodiments 42-43, wherein the contacting comprises coating the reclaimed asphalt with the at least one naphthenic ester.

47. The method of embodiment 46, further comprising heating the coated reclaimed asphalt.

48. The method of embodiment 47, further comprising compacting the heated and coated reclaimed asphalt.

49. The method of any of embodiments 42-48, wherein the reclaimed asphalt comprises an aged bitumen.

50. The method of embodiment 49, wherein the reclaimed asphalt further comprises an aggregate.

51. A rejuvenated asphalt comprising a reclaimed asphalt and at least one naphthenic ester.

52. The rejuvenated asphalt of embodiment 51, wherein the naphthenic ester comprises about 0.1 to about 5 wt. % of the rejuvenated asphalt.

53. The rejuvenated asphalt of embodiment 51, wherein the naphthenic ester comprises about 0.5 to about 1 wt. % of the rejuvenated asphalt.

54. The rejuvenated asphalt of any of embodiments 51-53, wherein the reclaimed asphalt comprises an aged bitumen.

55. The rejuvenated asphalt of any of embodiments 51-54, wherein the reclaimed asphalt further comprises an aggregate.

The invention claimed is:

1. A composition comprising:
   a bituminous binder; and
   a rheology modifier comprising at least one naphthenic ester.

2. The composition according to claim 1, wherein the bituminous binder comprises at least one of a reclaimed asphalt pavement binder, a reclaimed asphalt shingle binder, a virgin binder, or a performance-grade binder.

3. The composition according to claim 2, wherein the bituminous binder comprises a reclaimed asphalt pavement binder.

4. The composition according to claim 2, wherein the bituminous binder comprises a reclaimed asphalt shingle binder.

5. The composition according to claim 2, wherein the bituminous binder comprises a virgin binder.

6. The composition according to claim 2, wherein the bituminous binder comprises a performance-grade binder.

7. The composition according to claim 6, wherein the bituminous binder comprises at least one of a PG 58-28 binder, PG 52-34 binder, PG 58-34 binder, PG 64-28 binder, PG 64-22 binder, a PG 58-31 binder, a PG 58-37 binder, a PG 58-40 binder, a PG 64-25 binder, or a PG 64-31 binder.

8. The composition according to claim 1, wherein the bituminous binder further comprises at least one polymeric material.

9. The composition according to claim 8, wherein the polymeric material comprises at least one of an elastomer or a rubber.

10. A composition comprising:
    a recycled asphalt material containing aged bitumen and an aggregate; and
    at least one naphthenic acid ester.

11. The composition of claim 10, further comprising virgin bitumen binder.

12. The composition according to claim 10, wherein the at least one naphthenic acid ester is present in about 0.10 to about 1.0 wt. % of the total weight of the recycled asphalt material.

13. The composition according to claim 12, wherein the at least one naphthenic ester is present in about 0.5 wt. % of the total weight of the recycled asphalt material.

14. A hot-mix asphalt composition comprising:
    a recycled asphalt material containing aged bitumen and an aggregate:
    virgin binder; and
    at least one naphthenic acid triglyceride.

15. The composition of claim 10, wherein the naphthenic acid ester contains a naphthenic acid residue content of at least 60 wt. %.

16. The composition of claim 15, wherein the naphthenic acid ester contains a naphthenic acid residue content of at least 75 wt. %.

17. The composition of claim 16, wherein the naphthenic acid ester contains a naphthenic acid residue content of at least 80 wt. %.

18. A method of preparing a rejuvenated asphalt, comprising:
    selecting a reclaimed asphalt; and
    contacting it with at least one naphthenic ester.

19. The method of claim 18, wherein the reclaimed asphalt comprises RAP or RAS.

20. A rejuvenated asphalt comprising a reclaimed asphalt and at least one naphthenic ester.

21. The rejuvenated asphalt of claim 20, wherein the naphthenic ester comprises about 0.1 to about 5 wt. % of the rejuvenated asphalt.

22. The rejuvenated asphalt of claim 20, wherein the naphthenic ester comprises about 0.5 to about 1 wt. % of the rejuvenated asphalt.

23. The rejuvenated asphalt of claim 20, wherein the reclaimed asphalt comprises an aged bitumen.

24. The rejuvenated asphalt of claim 20, wherein the reclaimed asphalt further comprises an aggregate.

* * * * *